Figure 3:
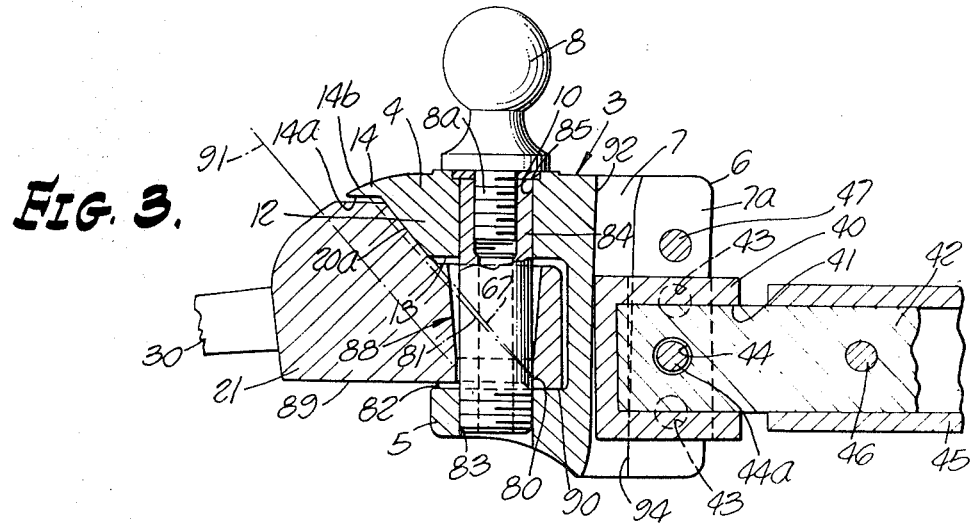

United States Patent

[11] 3,600,004

| [72] | Inventor | Clarence E. Newkirk<br>2265 S.E. Main St., Santa Ana, Calif. 92707 |
|---|---|---|
| [21] | Appl. No. | 873,210 |
| [22] | Filed | Nov. 3, 1969 |
| [45] | Patented | Aug. 17, 1971 |

[54] TRAILER COUPLING DEVICE
18 Claims, 12 Drawing Figs.

[52] U.S. Cl. ..................................................... 280/406 A, 280/446 B
[51] Int. Cl. ...................................................... B62d 53/00
[50] Field of Search .......................................... 280/406 A, 406, 446 B, 489

[56] References Cited
UNITED STATES PATENTS

| 2,793,878 | 5/1957 | Toland | 280/406 A |
| 2,940,776 | 6/1960 | Curtis | 280/446 B |
| 3,370,867 | 2/1968 | Berlincourt | 280/406 A |

*Primary Examiner*—Leo Friaglia
*Attorney*—Lyon & Lyon

ABSTRACT: A coupling device for connecting a trailer to a towing vehicle by means of a ball and socket connection, employs first and second pivotally connected control elements, one secured relative to the towing vehicle and the other connected by diverging spring bars to elements of the trailer frame. A shank carrying the ball serves as a pivot pin connecting the control elements, the latter having cooperating contacting surfaces shaped to permit relative pivoting movement about the shank axis. Cam means on the contacting surfaces are shaped to cause relative tilting movement between the control elements upon relative pivotal movement about said axis. The contacting surfaces may be conical or otherwise shaped as a part of a surface of revolution about said axis.

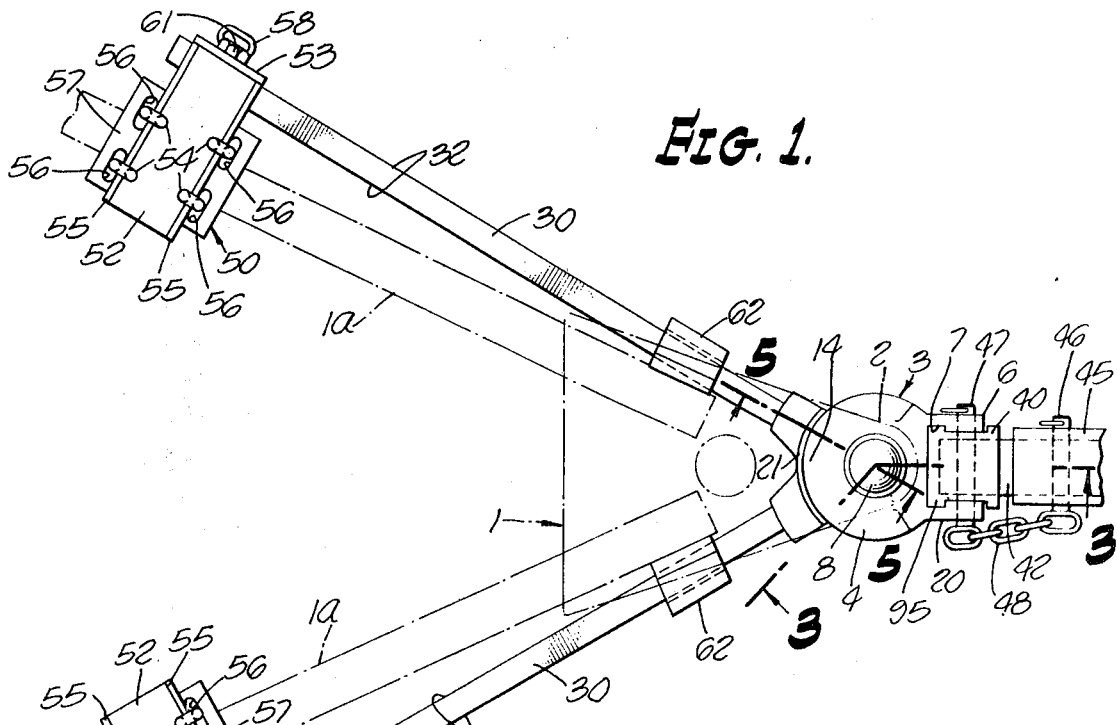
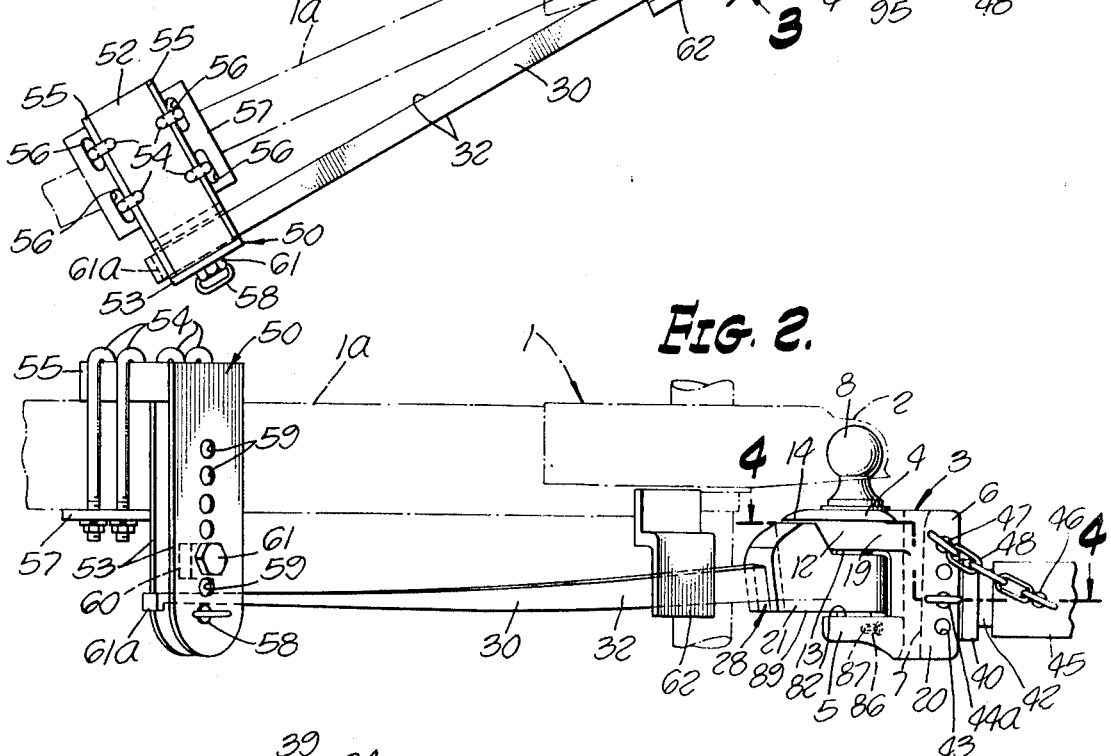
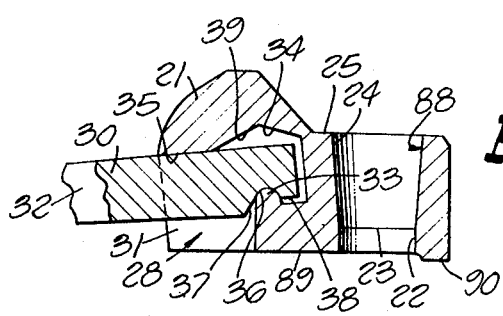

PATENTED AUG 17 1971

3,600,004

SHEET 2 OF 3

INVENTOR
CLARENCE E. NEWKIRK
BY
*Lyon+Lyon*
ATTORNEYS

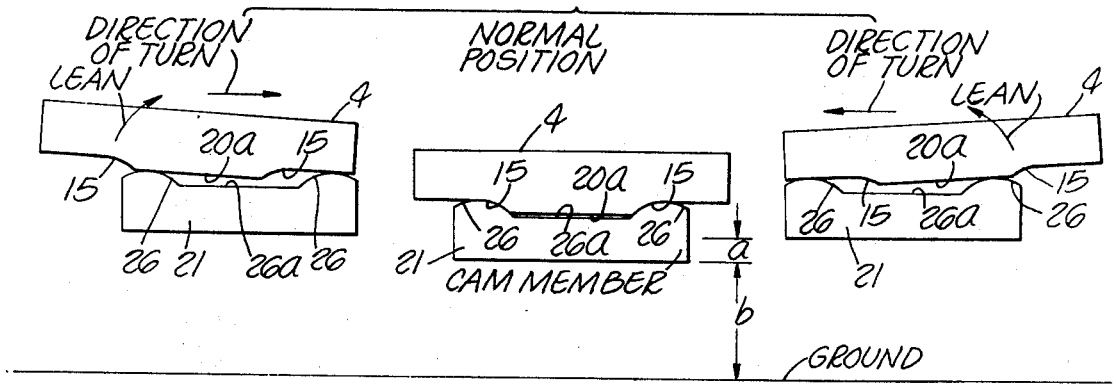
FIG. 8.
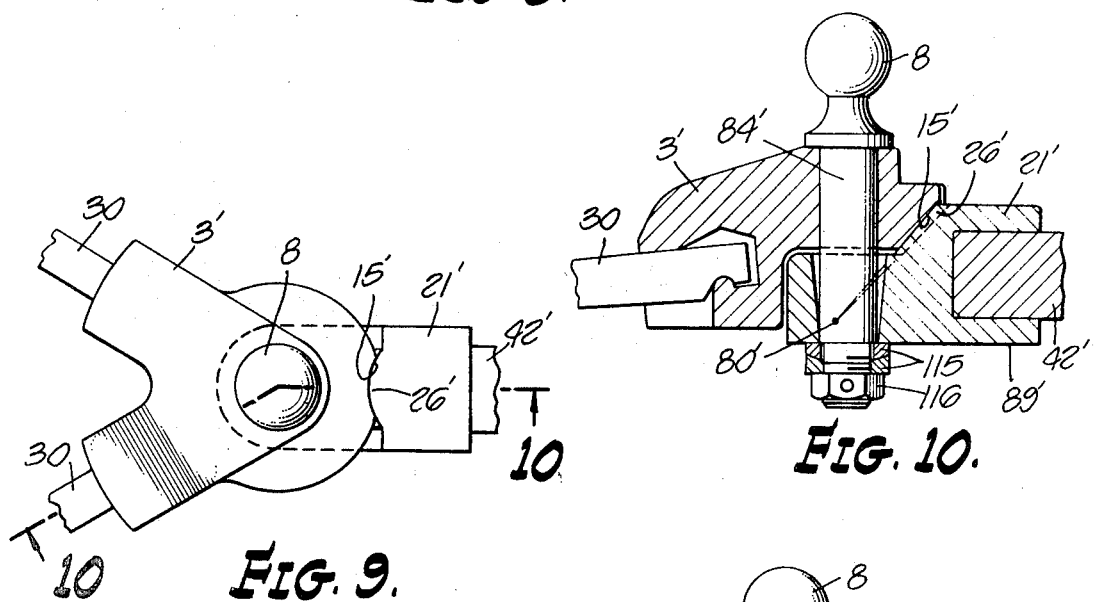
FIG. 9.
FIG. 10.
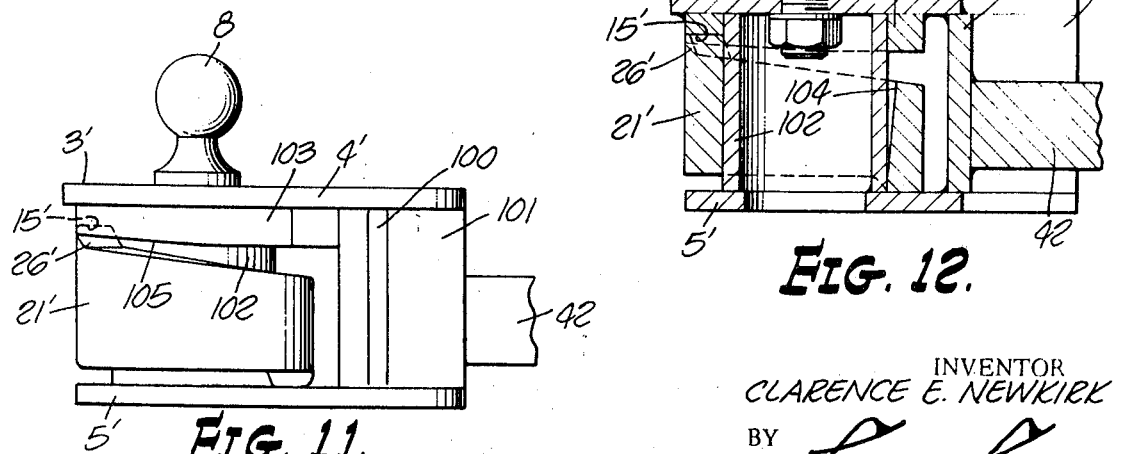
FIG. 11.
FIG. 12.
INVENTOR
CLARENCE E. NEWKIRK
BY
Lyon & Lyon
ATTORNEYS

TRAILER COUPLING DEVICE

This invention relates to coupling devices, also known as trailer hitches, used for towing a trailer, mobile home and the like behind a towing vehicle. More particularly, it relates to load-equalizing and draft-stabilizing couplers between towed and towing vehicles.

While pulling a trailer behind a towing vehicle, certain dangerous conditions and problems are presented to the driver that are not presented when driving an automotive vehicle by itself. Among these dangerous conditions are the hazard of jackknifing, and the application of vertical, or lateral, or twisting forces which may be applied to the towing vehicle and occasioned by an uneven roadway, side wind loads on the trailer, or combinations of these. To minimize these dangerous conditions, the coupling device should distribute a portion of the front tongue load of the trailing vehicle to the front wheels of the towing vehicle, while counteracting the tendency of the connection to sag, and the coupling device should minimize the hazard of jackknifing, as well as minimizing forces tending to overturn the towing vehicle.

The coupling device of the present invention provides interengaging portions on pivotally connecting members cooperating with resilient means applied between the trailer and the coupling device to hold the trailer in line during straightaway travel of both vehicles with a restraining torque that stops sidesway and eliminates the possibility of jackknifing.

Another feature of the coupling device of this invention is that it provides a vertical lifting of the load and rear of the automotive vehicle while both vehicles are negotiating turns, with increased control by the driver particularly at higher rates of speed or during circuitous courses with frequent sharp turns.

Another feature of the present invention lies in the provision of a coupling device with simplified structure to counteract the tendency to sag at the connection between towed and towing vehicles.

A further object is to provide a coupling device which during the turning of a towed and towing vehicle produces a tendency to raise the outside of the automotive vehicle, tilting the car laterally with respect to the trailer as to lean the towing vehicle into the turn. This action positively stops the towing vehicle from leaning away from the turn.

A further object is to provide a device of this character in which various sizes of spring bars are readily releasably secured to the same coupling device at one end thereof so that large differences in trailer tongue loads require only changing the size of spring bar. Also the spring bars may be readily removed so that the coupling device can be used as a hitch ball carrier for light utility trailers, where the spring bars are not required.

A further object of the invention is to provide a coupling device which during straightaway travel maintains towed and towing vehicles in a straight line with increased stability and resistance to sidesway, bobbing and undulating motion of the vehicles, and lateral tilting of the towed vehicle as due to side suction when passing other vehicles at high rates of speed.

A further object is to provide a coupling device that is easily adjusted vertically with respect to the towing vehicle to accommodate various trailers with different tongue heights for maintaining the various trailers level when they are being towed.

A further object of the invention is to provide a device of this character with additional safety features. Specifically, should the ball and socket connection fail, means are provided to prevent disconnection of the trailer from the towing vehicle without relying upon the conventional safety chain, while still maintaining to a safe degree the towability of the trailer.

Figure 4:
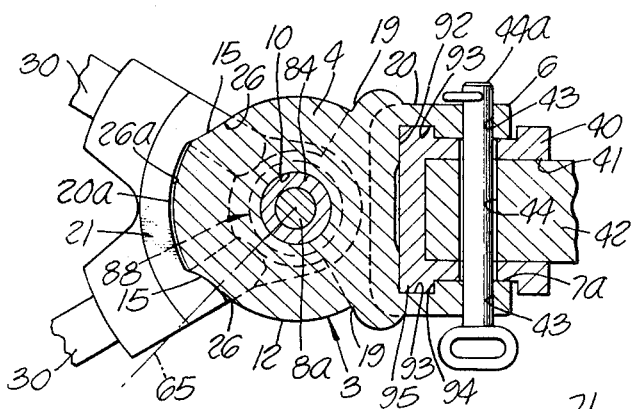
Figure 6:
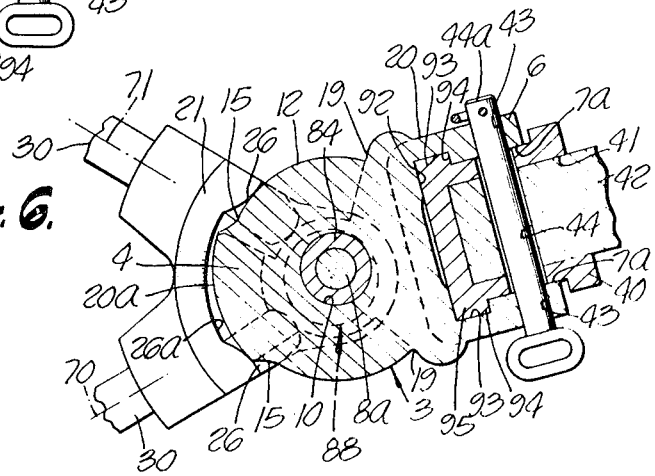
Figure 7:
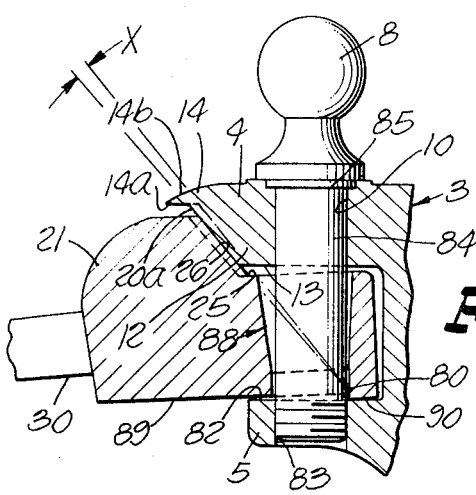

Other objects and a fuller understanding of my invention may be had by referring to the following description and claims, taken in conjunction with the accompanying drawings, in which:

FIG. 1 is a top plan view of my trailer coupling device.
FIG. 2 is a side elevation of the coupling device.
FIG. 3 is a cross-sectional view taken along the line 3–3 of FIG. 1.
FIG. 4 is a cross-sectional view taken along the line 4–4 of FIG. 2.
FIG. 5 is a cross-sectional view taken along the line 5–5 of FIG. 1.
FIG. 6 is a view similar to FIG. 4, when the towing and towed vehicles are in a left-hand turn.
FIG. 7 is a view similar to FIG. 3, while both vehicles are in the same left-hand turn.
FIG. 8 is a diagrammatic view showing the lifting and tilting action of the device of this invention during turning movement of the coupled vehicles.
FIG. 9 is a fragmentary top plan view showing a first modification.
FIG. 10 is a cross-sectional view taken along the line 10–10 of FIG. 9.
FIG. 11 is a side elevation showing a second modification.
FIG. 12 is a sectional elevation of the device of FIG. 11.

Referring to the drawings, and particularly to FIGS. 1 through 8 inclusive, which illustrate a preferred embodiment of the invention, the coupling device is used in connection with a trailer having a trailer frame 1 with a pair of converging arms 1a terminating in an apex including a socket 2. The coupling device includes a mounting structure 3 being preferably a metal casting having a rearwardly extending top portion 4 and a rearwardly extending bottom portion 5 joined together by a vertically disposed U-shaped member 6 which includes a vertically disposed T-shaped slot 7 extending through both top and bottom portions and open toward the towing vehicle with vertically and laterally disposed sidewalls 7a. Extending forward from a backwall 92 of the T-slot are portions 93 of the sidewalls 7a spaced further laterally apart and ending in a pair of transverse lips 94. The top portion 4 includes a downwardly pointing partially cone-shaped and truncated part 12 best shown in FIG. 4, having a cylindrical opening 10 therein substantially coincident with the axis of the cone and lying substantially centered with and behind the U-shaped member 6. Forwardly of the opening 10 the lateral surface of the cone-shaped part 12 ends and abuts a pair of angularly forward and laterally spaced vertical sidewalls 19 which preferably radius forwardly around into the outside walls 20 of the U-shaped member 6. The partially cone-shaped part 12 is truncated downwardly at the surface 13. At the base of the partially cone-shaped part 12 is an outwardly extending ledge part 14 having a horizontal bottom face 14a and a curved upper part 14b adjoined in a preferably circular perimeter. On the rearward portion of the lateral surface of the partially cone-shaped part 12 is a projecting portion 20a similarly conically shaped and extending partially about the opening 10 and ending in a pair of laterally and symmetrically spaced preferably cylindrically shaped recesses 15 running tangentially into the lateral surfaces of the partially cone-shaped portion 12. The line of tangency is represented by the numeral 67 (FIG. 3) where it is shown extended to a point represented by the numeral 80. A projection of the line 67 into a horizontal plane is represented by the numeral 65 shown in FIG. 4.

The lateral surface of the conically shaped projecting portion 20a appears as a line in FIG. 3 being represented by the numeral 81 and is designed preferably to extend and intersect the line 67 at a point 80 forward the opening 10 and near the top of the bottom portion 5. In the cross-sectional view (FIG. 4) the recess 15 appears as a quarter ellipse while the conically projecting portion 20a appears as a segment of a circle with a radius larger than that of the partially cone-shaped portion 12. The rearwardly extending bottom portion 5 of the mounting structure includes an upper horizontal face 82 and has a vertically disposed threaded portion 83 the axis of which is coincident with that of the cylindrical opening 10.

Adapted to be received in the socket 2 of the frame 1 of the trailer is a ball member 8 having an extended shank portion 8a threadedly inserted into a preferably tubular member 84 with a lockwasher 85. The tubular member acts as a larger extended shank portion of the ball member 8 and is inserted through the opening 10 threadedly engaging the threaded portion 83 of the bottom portion of the mounting structure. The ball member 8 shoulders against the top of the mounting structure which is counterbored to clear the lockwasher. For increased rigidity it is to be understood that the ball member may be constructed with a heavier and longer shank portion, thereby eliminating the tubular member and lockwasher, while the preferred form shown in FIG. 3 allows various size ball members to be used on the coupling device with possible longer neck portions. For locking the tubular member in threaded engagement, a setscrew 86 is preferably used in the bottom portion 5 of the mounting structure forcibly impinging a preferably plastic insert 87 against the threaded portion of the tubular member 84.

Received on the tubular member 84 between the top and bottom portions of the mounting structure 3 is a cam member 21, preferably made of a metal casting. The opening 88 for reception on the tubular member is preferably composed of an internally cylindrical portion 22 blending at a lower point 23 into an internally tapered cylindrical portion 24 with a larger diameter at its upper end 25 which is substantially parallel to the surface 13 of the top portion 4 of the mounting structure and spaced slightly apart therefrom. The cam member has a lower substantially horizontal surface 89 spaced apart from the horizontal face 82 of the bottom portion 5 of the mounting structure, the forward end of which has a downward protruding part 90 abutting the face 82 of the mounting structure. The cam member also has a pair of preferably cylindrical projecting cam portions 26 adapted to securely lie in the pair of recesses 15 of the mounting structure during straightaway travel of the towed and towing vehicles. Between the cam portions is an interior conical surface 26a on the cam member of slightly larger radius than the projecting portion 20a of the mounting structure. The axis of the right hand cylindrically projecting cam portion is represented by the numeral 91 in FIG. 3, and is parallel to the line represented by the numeral 67.

The cam member 21 also has a pair of rearwardly and angularly extending socket portions 28 (FIG. 5) in laterally and symmetrically spaced relationship to the opening 10 in the mounting structure, and adapted to releasably secure the forward ends of a pair of spring bars 30. Each socket portion 28 has vertically disposed sidewalls 31 to secure the sides 32 of the spring bars 30. Each socket portion includes an upwardly preferably circular protrusion 33 between the sidewalls 31 above which is a roof portion 34. Each roof has a slightly downwardly slanting portion 35 above and rearwardly oriented with respect to each circular protrusion 33 adapted to abut the top of each spring bar. Each socket is open below its roof rearward from each circular protrusion 33. Each spring bar is preferably rectangular in shape near its forward end and tapered rearwardly toward its free end to a smaller vertical dimension while the width of each pair of spring bars is held the same. Adjacent the forward end of each spring bar is a recess 36 adapted to be received on its respective upward protrusion 33 of each socket 28. Each recess 36 has a downwardly and rearwardly extending portion 37 and a forward portion 38 below the roof of each recess 36 parallel to the top of the spring bar. The roof 34 of each socket has also forward of each slightly downwardly slanting portion 35 an increased slanting portion 39. The separation between the top of each spring bar and the forward portion 38 of each recess 36 is made slightly less than the separation between the roof portion 39 and the circular protrusion 33 of each socket 28 so that each spring bar can be inserted or detached only at the increased angle of the slanting roof portion 39, thereby insuring maximum safety during towing of the trailer under adverse driving conditions. Also when heavier trailer loads are to be towed with the same couple device, heavier spring bars can be inserted in each socket having increased height dimensions between the forward top portion of each spring bar just behind the recess 36.

Adapted to be inserted in the T-shaped slot 7 of the mounting structure 3 is an adjusting member 40 with rearwardly and laterally spaced ears 95 adapted to preferably snugly fit between each lip 94 and the backwall 92 of the T-shaped slot 7. The adjusting member 40 also has a longitudinally extending and preferably square hole 41 open forwardly therein. One end of a square bar 42 is adapted to be inserted into the hole 41 of the adjusting member. A plurality of vertically spaced transverse holes 43 extend through the forward legs of the U-shaped portion 6 of the mounting structure. These are provided for vertical positioning of the adjusting member 40 with the square bar 42 inserted therein. A transverse clearance hole 44 passing through the adjusting member and square bar is aligned with one of the transverse holes 44a and a detachable pin is inserted therethrough. The other end of the mounting bar 42 is adapted to be snugly inserted in a supporting tube 45 secured to and projecting rearwardly from a towing vehicle, not shown. The mounting bar is secured to the supporting tube 45 by a removable pin 46. For increased safety, another removable pin 47 is preferably provided, passing through one of the unused vertically spaced holes 43 with a chain 48 attached to one end of both pins 46 and 47. The ears 95 on the adjusting member lying in the T-shaped slot receive all the stress due to upward flexing of the spring bars with ample clearance in the hole 44 about the pin 44a, yet should pin 44a fail the chain will hold. Also it is seen that both pins 46 and 47 would have to come out together before the mounting bar 42 can pull out of the tube 45.

Near the free ends of the spring bars 30 are a pair of brackets 50 (preferably made of metal casting) adapted to be secured to the forwardly converging arms 1a of the trailer frame 1, each bracket including a horizontally disposed U-shaped portion 52 with upwardly extending legs 55. The bottom of each U-shaped portion lies on top of each converging arm and secured outwardly therefrom is a pair of downwardly extending parallel plate parts 53 passing over each spring bar and confining the side portions 32 thereof. Each bracket 50 is secured to the frame arms by means of four J-bolts 54 hooking over the extending legs 55 of the U-shaped portions. The J-bolts 54 extend downwardly in close contact with the side portions of the frame arms of the trailer through like slots 56 in a pair of plates 57. These plates are securely bolted beneath the frame arms. Each spring bar 30 is secured in upwardly flexed position by a removable pin 58 passing transversely through one of a plurality of vertically spaced apertures 59 in each pair of plates 53, the plurality of apertures providing means for adjustable upward bias of each spring bar. A block 60 is provided to be inserted between each pair of plates 53 and secured in place by a bolt 61 above each spring bar so that the pin 58 can be readily inserted repeatedly in the same adjusting aperture 59 for consistent spring tension of each spring bar during installation of the coupling device, the flexing of each spring bar functioning to transmit a portion of the load of the front of the trailer to the front wheels of the automotive vehicle.

The rearward free end of each spring bar 30 preferably has a downward protruding portion 61a so that the spring bars cannot disconnect from their respective brackets should, for instance, the ball and socket connection fail. The brackets 50 also act as means for securing the spring bars 30 and also thereby the rearward end of the cam member 21 from moving laterally with respect to the frame 1 of the trailer.

A pair of ears 62 may be provided as an additional safety feature should the ball and socket connection fail. These ears 62 are preferably substantially Z-shaped for convenience in attaching one end 62 as by welding to the trailer frame arms 1a having the other ends free to pass downwardly in close juxtaposition to the outer surfaces of the spring bars 30 and preferably located near the forward ends of the spring bars, whereby, should the ball connection fail, the trailer frame will tend to move rearwardly as to wedge the ears 62 to the spring bars as to prevent the socket 2 on the trailer frame from moving off of the mounting structure 3 laterally as well as rearwardly.

The upwardly flexing of the spring bars 30 along with means for lateral securement cooperate with the projecting portions 26 of the cam member 21 to liftingly interengage and seat in the laterally spaced recesses 15 in the mounting structure 3 between which lies the conically projecting portion 20a as to stabilize the tractor-trailer combination during straightaway travel of both vehicles while supplying a substantial restraining torque to keep the towed vehicle from swaying side to side, which might otherwise lead to the hazardous possibility of jackknifing.

The turning operation of the coupling device is best illustrated in FIGS. 6 and 7 while being further clarified by the diagrammatic illustration in FIG. 8. In FIG. 8, the cylindrically projecting portions 26 on the cam member 21 appear as partial circles, it being understood that the axis of each projecting portion, which lies in each recess 15, is angularly offset from a line through the direction of travel and represented by the numeral 65, as previously explained. During a left-hand turn the conically projecting portion 20a on the mounting structure rotates opposite to the direction of the turn, articulating the right-hand portion of the interengaging pair of cam member and mounting structure apart by an angular amount represented by the letter x in FIG. 7 substantially about the point represented by the numeral 80. This action substantially increases the flexing of the right-hand spring bar, applying a lift to the coupling device, thereby also lifting the trailer frame and rear of the automotive vehicle shown by the distance a and the distance b in FIG. 8. Tests reveal that the amount of lift a depends upon the amount the spring bar is preflexed and the size of the spring bar when using the same towing and towed vehicles. The line of action of spring bars 30 is represented by the numeral 70 for the right-hand spring bar and by the numeral 71 for the left-hand spring bar. During a left-hand turn, as shown in FIG. 6, the upward flexing along the left line 71 is further offset from a line through the direction of travel than the upward flexing along the right line 70. If both sides of the coupling device were articulated apart equally, there would be no imbalance of forces tending to raise the left-hand side of the car tilting the car away from the turn. Tests show that the present embodiment which supplies right-hand articulation between pivoting members below the ball member during a left-hand turn preferably raises the right-hand side of the automotive vehicle, thereby leaning the car into the turn with increased ease in steering when towing a trailer. Tests with other cam configurations showed that, when both spring bars are equally stressed or the left-hand spring bar was stressed more than the right-hand spring bar during a left-hand turn, the automotive vehicle was caused to lean away from the turn.

Increased stability during turning is provided by the nature of the interengaging cam portions which also act to restore the trailer to straight line travel upon finishing a turn. The recess 15 of the mounting structure lying outside the turn tends to restore the cylindrically projecting portion 26 of the cam member 21 on the side of the trailer outside the turn, under which side is the spring bar which has been increasingly flexed by the turn. This principle applies increased restoring torque by the coupling device to the towed vehicle.

In the modified form of the invention shown in FIGS. 9 and 10, the cam member and mounting structure are reversed in position, as compared to the structure of the embodiment shown in FIGS. 1—7. In this modification, the cam member 21' is adapted by way of a mounting bar 42' to be attached to a towing vehicle, not shown. The mounting structure 3' is provided with the sockets for detachably securing the pair of diverging spring bars 30. The lower portion of the mounting structure 3' has been omitted, its function being replaced by a pair of conventional spherical washers 115 on the extended shank portion of the ball member and held against the face 89' with a nut 116, preferably pinned to the shank. A single preferably cylindrical protruding portion 26' is used on the cam member 21' lying in a single recess 15' of the mounting structure. Adjacent parts of the recess and projecting portions 15' and 26' respectively are similarly conically shaped, as in the embodiment described above, for articulation about a point represented by the numeral 80'. An advantage of this form of the invention is a decrease in casting weight. In operation, relative turning movement of the members 21' and 3' about the axis of the pin 84' results in relative longitudinal tilting of the members.

In the second modified form of the invention shown in FIGS. 11 and 12, the top portion 4' and the bottom portion 5' of the mounting structure 3' are spaced apart by a lateral web 100 and welded thereto. The top and bottom portions 4' and 5' are preferably of plate-type construction. Included also are longitudinally extending webs 101 spaced laterally apart and welded between the top and bottom plate portions. Between the webs 101 is welded a mounting bar 42 for attachment to a towing vehicle, not shown. A ball member 8 is conventionally attached to the top portion 4'. Between the top and bottom portions 4' and 5' is an exterior tubular member 102 secured thereto as by welding and is substantially coaxial with the ball member 8. A cam member 21' is provided with an interiorly and rearwardly tapered cylindrical opening 104 therein adapted to be pivotally received on the tubular member 102 having rearwardly on its top an upwardly preferably cylindrical projecting portion 26'. On the bottom of the upper plate portion 4' of the mounting structure is another tubular member 103 surrounding the tubular member 102 and attached as by welding to the mounting structure. The rearward bottom portion of the tubular member 102 is recessed at 15' to receive part of the projecting portion 26', the recess having preferably arcuate portions 105 on both sides thereof.

The cam member 21' is constructed for detachable connection to the spring bars 30, as described in detail in connection with the embodiment shown in FIGS. 1—7. The device of this modification functions similarly to the preferred embodiment except the cam member is allowed to articulate downwardly only in a vertical plane passing through the direction of travel of the towed vehicle, not shown, and has the advantage of welded construction.

I claim:

1. In a coupling device for connecting a trailer to a towing vehicle, the trailer having converging frame parts provided with a ball-receiving socket, the improvement comprising, in combination: a ball member adapted to be received in the socket, a pair of control elements pivotally connected together below said ball member for movement about an axis passing through the center of the ball member, the ball member being fixed with respect to one of said control elements, means for fixedly connecting one of said pair of control elements to said towing vehicle, a pair of elongated spring bars, each spring bar being secured at one end thereof to the other of said pair of control elements, the spring bars converging toward the latter said element, means engaging the spring bars remote from the latter said control element and adapted for connection to the converging frame parts for upward flexing of said spring bars, said control elements having cooperating contacting surfaces shaped to permit relative pivoting movement of said control elements about said axis, and cam means on said contacting surfaces shaped to cause relative tilting movement between the control elements upon relative pivoting movement thereof about said axis occasioned by turning of the towing vehicle with respect to the trailer.

2. The combination set forth in claim 1 in which the relative tilting movement is both lateral and longitudinal.

3. The combination set forth in claim 1 in which the ball member is fixed to a shank coaxial of said axis, said shank acting as a pivot pin between said control elements, and means detachably fixing the shank to one of the control elements.

4. The combination set forth in claim 1 in which the ball member is fixed with respect to the control element which is adapted for connection to the towing vehicle.

5. The combination set forth in claim 1 in which the ball member is fixed with respect to the control element having the spring bars secured thereto.

6. The combination set forth in claim 1 in which each of the spring bars is detachably connected to the same control element.

7. The combination set forth in claim 1 including retainer means adapted for attachment to the converging frame parts of the trailer, said retainer means overlying said spring bars and adapted to contact the spring bars to minimize relative lateral movement between the converging frame parts and said spring bars.

8. The combination set forth in claim 1 in which said cooperating contacting surfaces are conical.

9. The combination set forth in claim 1 in which each of said contacting surfaces comprises at least a portion of a surface of revolution about said axis.

10. The combination set forth in claim 1 in which one of said cooperating contacting surfaces is formed upon an annular part of one of said control elements, said annular part encircling a portion of the other control element, and the other of said cooperating contacting surfaces being formed upon the other control element.

11. In a coupling device for connecting a trailer to a towing vehicle, the trailer having converging frame parts provided with a ball-receiving socket, the improvement comprising, in combination: a first control element, means for fixing said first control element relative to said towing vehicle, a second control element, a ball member secured relative to the second control element and adapted to be received in the socket, a shank fixed to the ball member forming a pivotal connection between said control elements about an axis coaxial of the shank, a pair of elongated spring bars, each spring bar being detachably secured at one end thereof to said second control element, the spring bars converging toward the second control element, means engaging the spring bars remote from the second control element and being adapted for connection to the converging frame parts for upward flexing of said spring bars, said control elements having cooperating contacting conical surfaces shaped to permit relative pivotal movement of said control elements about said axis, and cam means on said contacting surfaces to cause relative lateral tilting movement between the control elements upon relative pivoting movement thereof about said axis occasioned by turning of the towing vehicle with respect to the trailer.

12. In a coupling device for connecting a trailer to a towing vehicle, the trailer being provided with a ball-receiving socket, the improvement comprising, in combination: a ball member adapted to be received in the socket, a pair of control elements pivotally connected together below said ball member for movement about an axis passing through the center of the ball member, the ball member being fixed with respect to one of said control elements, means for fixedly connecting one of said pair of control elements to said towing vehicle, said control elements having cooperating contacting conical surfaces shaped to permit relative pivoting movement of said control elements about said axis, and cam means on said contacting surfaces shaped to cause relative tilting movement between the control elements upon relative pivoting movement thereof about said axis occasioned by turning of the towing vehicle with respect to the trailer.

13. The combination set forth in claim 12 in which the said contacting conical surfaces are positioned behind the said axis adjacent the trailer.

14. The combination set forth in claim 12 in which the said contacting conical surfaces are positioned in front of said axis adjacent the towing vehicle.

15. The combination set forth in claim 12 in which the means for fixing the control element to the towing vehicle includes a tow bar member, means forming a vertical tongue and groove connection for adjustable positioning of the tow bar member with respect to the latter said control element, and means for securing the tow bar member in adjusted position.

16. In a coupling device for connecting a trailer to a towing vehicle, the trailer being provided with a ball-receiving socket, the improvement comprising, in combination: a ball member adapted to be received in said socket, a pair of control elements pivotally connected together below said ball member for movement about an axis passing through the center of the ball member, one of said control elements adapted to be connected to both said ball member and said towing vehicle, resilient means adapted to connect the other of said control elements to said trailer for holding portions of said control elements together, said portions of said control elements having cooperating contacting surfaces shaped to permit relative pivoting movement of said control elements about said axis, and cam means on said contacting surfaces shaped to cause vertical separation between the control elements upon relative pivoting movement thereof about said axis occasioned by turning of the towing vehicle with respect to the trailer, the tension in said resilient means increasing during such a turn.

17. The combination set forth in claim 16 in which said cam means on said contacting surfaces also cause relative lateral tilting movement between said control elements.

18. The combination set forth in claim 16 in which said resilient means is a pair of elongated spring bars.